June 18, 1929.  R. MAYER  1,717,722

HIGH SPEED REGULATOR AND GOVERNOR

Filed Jan. 23, 1926

Inventor
RUDOLF MAYER
By his Attorney

Patented June 18, 1929.

1,717,722

UNITED STATES PATENT OFFICE.

RUDOLF MAYER, OF BERLIN, GERMANY, ASSIGNOR TO RADIO CORPORATION OF AMERICA, A CORPORATION OF DELAWARE.

HIGH-SPEED REGULATOR AND GOVERNOR.

Application filed January 23, 1926, Serial No. 83,393, and in Germany February 21, 1925.

The present invention relates to an arrangement adapted to the regulation of electrical quantities by the high speed regulator principle.

More specifically my invention relates to means for high speed regulation by purely electrical means without the use of mechanical elements.

The object of my invention is to provide an arrangement for high speed regulation along purely electrical lines.

Further features and objects of my invention will be more fully understood from the detailed description herewith and the accompanying drawings in which:—

High speed regulators require for their operation as a general rule, the precise or fine adjustment of springs and weights. Since the re-setting or re-adjustment of springs can be done only by personnel specially trained for this object, this involves an element disadvantageous for the service.

In the following invention outlined, the above draw-back is to be obviated by means of electrical control of the high speed regulation without the use of spring forces and gravity.

Figure 1:
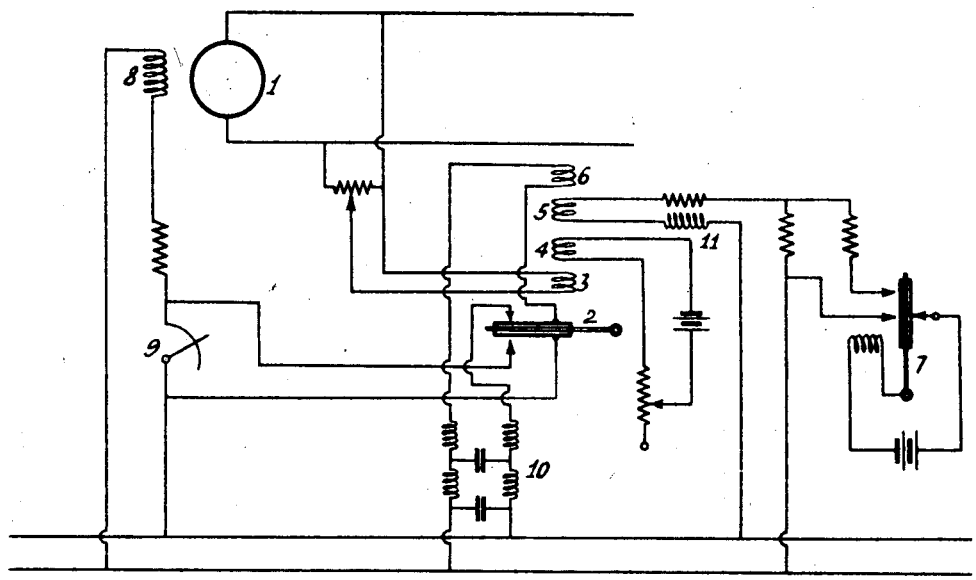
Fig. 1 is a diagrammatic sketch of an arrangement embodying my invention.

Referring to Fig. 1, 1 is a direct current generator whose terminal voltage $Eg$ is kept constant by varying the average current in the exciting winding 8 wherein variations are caused by periodic short-circuiting of the resistance 9. This short-circuiting is effected by means of a relay 2 which is subject to the influence or action of the currents of four windings 3, 4, 5, and 6. The current of winding 3 is proportional to the voltage $Eg$ that is to be kept constant. Through winding 4 there flows a constant direct current which most preferably acts in opposition to the current in winding 3, which current supplied for example from a battery serves as a basis or standard for the voltage $Eg$ to be kept at a constant value. In winding 5 there flows a variable direct current which fluctuates in regular sequence between two values, so that it tends to produce regular uniform opening and closing of relay 2. In winding 6 finally flows a direct current which varies conformably with the relationship between the opening and closing times of the relay 2, or which is proportional to the average exciting current of the winding 8.

Figure 2:
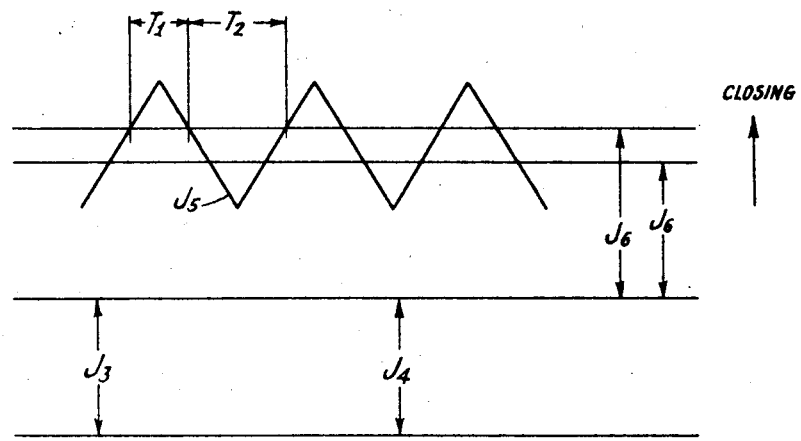
Fig. 2 is a graph showing the co-relation of the electric currents involved.

The smoothing of the alternating current characteristic produced in winding 6 by the periodic closing, as shown in the drawing, (Fig. 2), can be produced by the insertion of a filter chain 10. The co-action of the four currents is further explained by reference to Fig. 2. $J^5$ stands for the current in winding 5. The jagged shape of the characteristic of this current which is subject to the control of an interrupter 7, can be produced by the series connection of a self inductance 11. However, it may prove a more advantageous scheme to occasion the to-and-fro motion of the relay by means of condenser charges and discharges. Interrupter 7 is a make and break mechanism which simply changes the resistance in circuit 5 by periodically shunting a resistance in said circuit so that the current in said circuit is periodically varied as shown by $J^5$, Fig. 2.

Let it be assumed that when the relationship between the opening and closing time of the relay 2 is equal to unity, the direct current of the winding 6 is equal to $J^6$ and acts upon the relay in the sense of closure at the lower contact of 2, with the consequence that the co-action of currents $J^5$ and $J^6$ produces uniform opening and closing of the relay 2 when the effect of currents $J^3$ and $J^4$ balance. When the voltage $Eg$ varies the ratio between the closing time and the opening time will be changed, and the relay 2 will serve to vary the field of the electric generator to change its voltage to maintain the output voltage. Assume the voltage $Eg$ to increase due to the decrease of the load, for example, the effect of coil 3 increases and thus overcomes the constant force provided by coil 4. As a result the relay 2 tends to have a longer opening time and the circuit of coil 6 is closed for a longer period, thus drawing a greater average current so that the closure is maintained at the upper contact, that is, until the varying current of coil 5 reaches a value where it, combined with the effect of coil 4, overcomes the force of coils 6 and 3. The ratio of $T^1$ to $T^2$, that is the closing time to the opening time, becomes less than unity and the effective current in the field 8 is decreased, thus decreasing the voltage E$g$. Now, whenever the requisite ratio of the times $$\frac{T^1}{T^2} = \frac{\text{closing time}}{\text{opening time}}$$

necessary to maintain E$g$ constant changes, that is to say, if it becomes smaller, this results in a change in the mean direct current energy in winding 6, so that, under the conditions $J^3 = J^4$ it becomes feasible that a new state of balance between the opening and closing periods exists.

The cause underlying such a change in the relation of the times resides in a change of the voltage and consequently of the current $J^3$ which is to act upon the relay in the sense of closing in opposition to $J^4$. For instance, when the voltage rises, then, as a consequence of the increase of $J^3$, the zero line determined by $J^6$ will undergo a shift, so that $T^1 : T^2$, and thus the exciting current becomes smaller. This will occur until the voltage has been restored, that is, been reduced to the normal value. On account of the simultaneously produced increase in $J^6$, the new ratio $T^1 : T^2$ may persist.

It will be understood that the details of the method and arrangement herein set forth may be varied in that the general principles disclosed may be embodied in other arrangements different from those illustrated without departing from the spirit of the invention as defined in the following claims:

Having thus described my invention, what I claim is:—

1. In an arrangement for the regulation of electrical quantities of a controlled electrical device, electrical controlling means for varying said electrical quantities, a substantially constant source of current, means for producing a periodically varying current and a relay for influencing said controlling means, said relay having associated therewith four current paths for influencing its movement, one of said current paths being connected to the controlled device for providing a current dependent upon the electrical value to be controlled, a second of said current paths being connected to said constant source for supplying a current of substantially equal and opposite value to the current in said first path, the third path being connected to said periodically varying current means and adapted to open and close said relay periodically and said fourth path being connected to said controlling means and having an electrical flow therein dependent upon the electrical energy in the controlling means.

2. In an arrangement for the regulation of electrical quantities of a controlled electrical device, in combination means for varying said electrical quantities, a constant source of current, means for producing a periodically varying current, and means for influencing said first named means, said last named means being influenced by a plurality of current paths, one of said paths having a current flowing therein dependent upon the electrical value to be controlled, a second path being connected to said constant source, a third path being connected to said periodically varying current means and a fourth path being connected to said controlling means.

3. In an arrangement for the regulation of electrical quantities of a controlled electrical device, electrical controlling means for varying said electrical quantities, a substantially constant current means, a periodically varying source of current, a relay for periodically varying the current supplied to the controlling means and means responsive to variations of the controlled electrical device and including said constant source of current and periodically varying current means for varying the ratio of the opening and closing times of the relay whereby the average current in the controlling means is varied.

4. In an arrangement for the regulation of electrical quantities of a controlled electrical device, controlling means for varying said electrical quantities, a substantially constant source of current, means for producing a periodically varying current and a relay for influencing said controlling means, said relay having associated therewith four current paths for influencing its movement, one of said current paths being connected to the controlled device for providing a current dependent upon the electrical value to be controlled, a second of said paths being connected to said constant source for providing a current of substantially equal and opposite value to the current of said first path, the third path being connected to said periodically varying current means and adapted to open and close said relay periodically and said fourth path being connected to said controlling means and having an electrical flow therein dependent on the electrical energy in the controlling means and a filter device in said last named path for smoothing out any alternating current characteristic present in said winding due to said periodic closing whereby a substantially constant effect may be obtained through said path.

5. In an arrangement for the regulation of electrical quantities of a controlled electrical device, electrical controlling means comprising a resistance adapted to be periodically shunted for varying said electrical quantities, a substantially constant source of current, means for producing a periodically varying current, and a relay for influencing said controlling means, said relay having associated therewith four current paths for influencing its movement, one of said current paths being connected to the controlled device for providing a current dependent upon the electrical value to be controlled, the second of said paths being connected to said constant source and adapted to provide a current substantially equal and opposite in value to the current in said first path, the third path being connected to said periodically varying current means and adapted to open and close said relay periodically, and a fourth path being connected to said controlling means and having an electrical flow therein dependent on the electrical energy in the controlling means.

6. In an arrangement for the regulation of electrical quantities of a controlled electrical device, electrical controlling means for varying said electrical quantities, a substantially constant source of current, a device comprising a make and break mechanism for shunting a resistance in and out of a circuit for periodically varying the current in said circuit and a relay for influencing said controlling means, said relay having associated therewith four current paths for influencing its movement, one of said current paths being connected to the controlled device for providing a current dependent upon the electrical value to be controlled, a second of said paths being connected to said constant source and adapted to provide a current substantially equal and opposite in value to the current in said first path, the third path being connected to said periodically varying current device and adapted to open and close said relay periodically, and said fourth path being connected to said controlling means and having an electrical flow therein dependent on the electrical energy in the controlling means.

7. In an arrangement for the regulation of electrical quantities of a controlled electrical device, electrical controlling means for varying said electrical quantities, a make and break relay device for periodically varying the current supplied to the controlling means, a pair of oppositely wound current paths for influencing said relay device one thereof having a current flowing therein proportional to the electrical value to be controlled and the other having flowing therein a standard comparing current, and means continuously operative for influencing said relay device when the current in each of said current paths is equal.

8. In an arrangement for the regulation of electrical quantities of a controlled electrical device, electrical controlling means for varying said electrical quantities, a make and break relay device for periodically varying the current supplied to the controlling means, a pair of oppositely wound current paths for influencing said relay device one thereof having a current flowing therein proportional to the electrical value to be controlled and the other having flowing therein a standard comparing current, and means including a current path connected to said controlling means for assuring the operation of said relay device when the current flowing in each of said first mentioned paths is equal.

9. In an arrangement for the regulation of electrical quantities of a controlled electrical device, electrical controlling means for varying said electrical quantities, a make and break relay device for periodically varying the current supplied to the controlling means, a pair of oppositely wound current paths for influencing said relay device one thereof having a current flowing therein proportional to the electrical value to be controlled and the other having flowing therein a standard comparing current and means including a current path connected to said controlling means and having current smoothing out devices for assuring the operation of said relay device when the current flowing in each of said first mentioned paths is equal.

10. In an arrangement for the regulation of electrical quantities of a controlled electrical device, electrical controlling means for varying said electrical quantities, a make and break relay device for periodically varying the current supplied to the controlling means, a pair of oppositely wound current paths for influencing said relay device one thereof having a current flowing therein proportional to the electrical value to be controlled and the other having flowing therein a standard comparing current and a second pair of oppositely wound current paths for controlling said relay device when the current in each of said first mentioned pair of paths is equal.

Dr. RUDOLF MAYER.